INVENTOR.
COMER C. PIERCE
BY Kimmel & Crowell
ATTORNEYS.

3,063,754
AUTOMATIC WHEEL BALANCING DEVICE
Comer C. Pierce, 1551 Alexandria Place,
Jacksonville, Fla.
Filed Mar. 6, 1961, Ser. No. 93,781
4 Claims. (Cl. 301—5)

This invention relates to an automatic wheel balancing device and has as its primary object the provision of a device of this character which is adapted to be attached to the wheel of a motor vehicle and which will automatically compensate for uneven tire wear, unbalanced tire construction, recap tires, objects picked up in travel along the highway or other conditions creating an unbalance in a tire.

A further object of the invention is the provision of such a device which compensates for the above-mentioned conditions automatically as the vehicle is in motion by a centrifugal force.

An additional object of the invention is the provision of a device of this character which may be readily and expeditiously attached to the interior of the wheel of any drop center rim type wheel, either at the factory, or after the vehicle has been in use.

A further object of the invention is the provision of such a device which comprises metallic annulus which is secured at spaced points by suspension springs about the interior periphery of the wheel, and which contains an aggregate, such as shot or the like, suitably lubricated, so that the shot automatically seeks a position opposite the heavy point in an unbalanced tire to compensate for the same.

An additional object of the invention is the provision of such a device which, by reason of the inherent slight flexibility of the ring itself, and the spring suspension thereof, causes the ring itself to move to a position tending to correct such an unbalance.

An additional object of the invention is the provision of a device of this character which is sturdy and durable in construction, reliable and efficient in operation, and relatively simple and inexpensive to manufacture and install.

Figure 1:
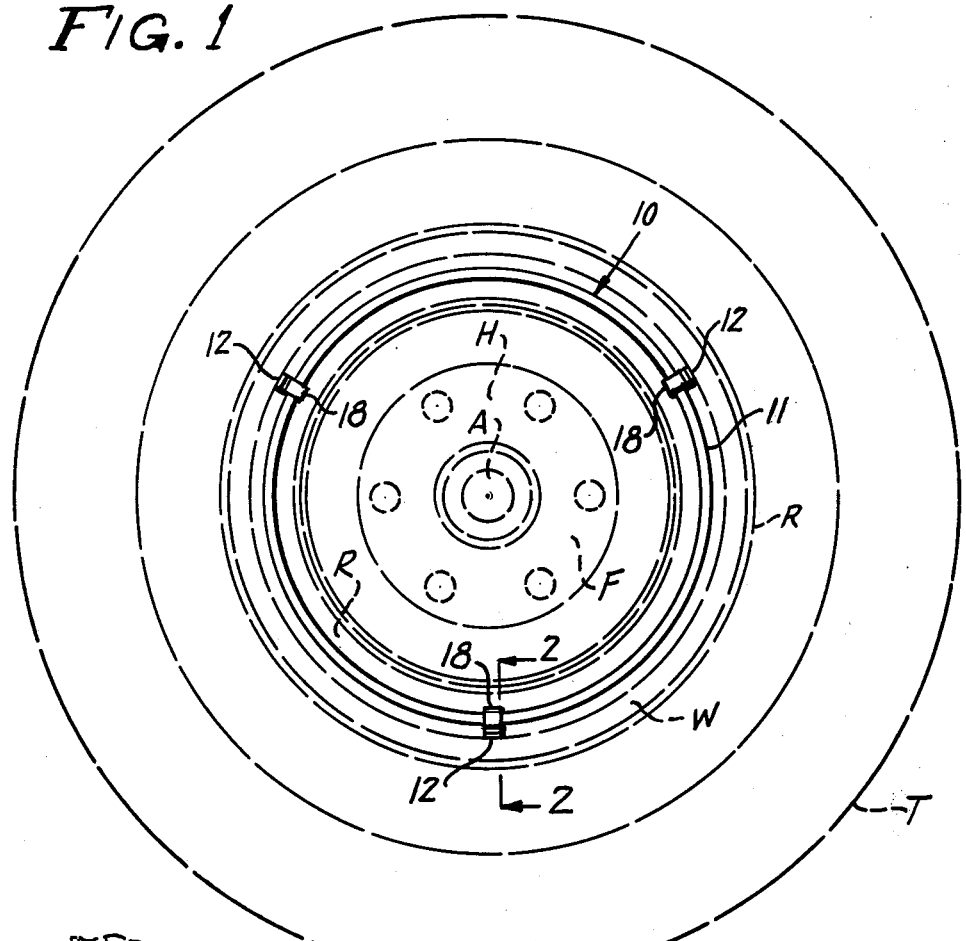
Figure 2:
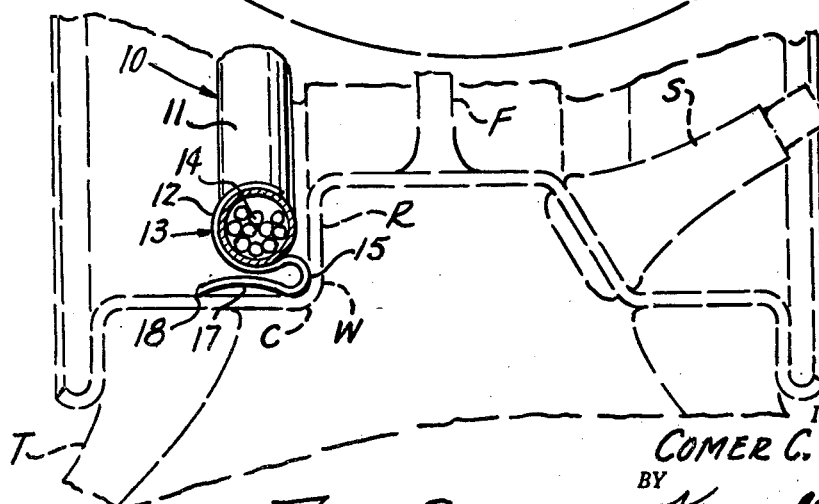

Other objects reside in combinations of elements, arrangements of parts, and features of construction, all as will be more fully pointed out hereinafter and disclosed in the accompanying drawing wherein:

FIGURE 1 is an elevational view of one form of device embodying the instant inventive concept shown as attached to the inside of a vehicle wheel, the latter being indicated in dotted lines; and FIGURE 2 is an enlarged sectional view taken substantially along the line 2—2 of FIG. 1 as viewed in the direction indicated by the arrows.

Similar reference characters refer to similar parts throughout the several views of the drawing.

Having reference now to the drawings in detail, the device of the instant invention is generally indicated at 10, and comprises an annular ring 11, which is preferably of metal of any desired thickness and weight, and which, as best shown in FIG. 2, is circular in cross section.

The tube contains a relatively small amount of aggregate 14, which may be in the form of lead shot, or similar articles or particles, the aggregate being lubricated, with any desired fluid or solid material, such as powdered graphite, mineral oil, or other suitable lubricant, which will enable it to move freely within the interior of the tube.

The tube 11 is adapted to be attached to the interior of the wheel W of a motor vehicle adjacent the drop center of rim R thereof, on the interior of the wheel as best shown in FIG. 2. The wheel is of any desired conventional drop center rim construction and includes a flange F and carries a tire T. The usual hub H is provided mounted on a shaft or axle A, all of conventional design, as shown in FIG. 1. The tire may also be provided with the usual valve stem S for filling.

The spring clips 12, as best shown in FIG. 2 comprise a substantially semi-circular outer portion 13 which encircles the tube and terminates in a reverted portion 15 which seats at the corner C of the drop center portion of rim R and on the horizontal portion of the wheel rim W. The bight portion 15 terminates in a laterally extending arcuate resilient arm 17, which in turn is provided with a sharp pointed extremity 18. When the device is in position, the bight portion 15 seats snugly at the juncture of the drop center of the rim and the horizontal flange of the wheel, and may, if desired, be suitably secured thereto in any desired manner, while the arcuate member 17 provides a resilient spring effect permitting yielding of the remainder of the clip and the tube ring associated therewith. The projecting point 18 digs solidly into the inner side of the wheel rim, to prevent slippage of the end of the clip, and add resiliency thereto.

In the accompanying drawings there have been shown, illustratively, three clamps equidistantly positioned about the periphery of the tubular ring, but it will be understood that any desired number of clamps such as four or more may be employed, if desired.

In the use and operation of the device it will be seen that as the wheel rotates the aggregate 14 tends, under conditions of perfect balance, to distribute itself evenly about the interior of the tube, but that upon the occurrence of an unbalanced condition, the aggregate will gravitate to the opposite side of the tubular ring, away from the heavy side to equalize the same. Similarly, the tube itself will, by centrifugal force, be biased against the resilient clips 12 serving partially to compensate for a condition of imbalance occurring in the wheel or tire.

From the foregoing it will now be seen that there is herein provided an improved automatic wheel balancing device, which operates effectively at all speeds of rotation of the wheel, and which accomplishes all the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:
1. An automatic balancing device for mounted wheels comprising a hollow tubular annulus, aggregate freely movable in said annulus, and resilient clips securing said annulus to a wheel at spaced intervals, said resilient clips comprising members having portions engaging said tube and other reverted portions spaced from and integral with said first portions, the latter portions engaging the rim of the vehicle wheel to movably secure said hollow tubular annulus in spaced relation to the rim.

2. A device for automatically balancing vehicle wheels in situ comprising a tubular annulus, aggregate freely movable in said annulus, resilient clips securing said annulus in spaced relation to the rim at spaced points, said resilient clips having semi-circular portions partially surrounding said tube and in gripping engagement therewith, said resilient clips further including U-shaped portions intergral with said semi-circular portions, said U-shaped portions removably secured to the rim of the wheel, said resilient clips flexible in response to an unbalance condition in the wheel to permit said tubular annulus to shift its center relative to the wheel and in a direction opposite the unbalanced portion of the same.

3. Automatic wheel balancing means for rotatable wheels for automatically compensating for imbalance of said wheels during rotation thereof, wherein said wheels are of the drop center rim type on which a tire is mounted, said means comprising a continuous hollow annulus, freely movable aggregate in said annulus, and resilient means wedging and retaining said annulus against a portion of said rim at spaced intervals on said rim, said resilient means permitting limited movement of said annulus towards said rim upon exertion of the centrifugal force of rotation of said wheel.

4. An automatic wheel balancing device for vehicle wheels comprising a tubular annulus, aggregate freely movable in said annulus, and resilient clips securing said annulus to a wheel at spaced intervals, said resilient clips comprising semi-circular members partially surrounding said tube and U-shaped portions integral with said semi-circular portions, said U-shaped portions seating against the rim of the vehicle wheel, one leg of each U-shaped portion being arcuate convexly to provide two-point contact with the rim, the semi-circular portions of said resilient spring clips being adjacent the arcuate leg of said U-shaped portion between the points of contact thereof with the rim, and said arcuate leg being yieldable to permit movement of said semi-circular members and said tubular annulus relative to the wheel.

References Cited in the file of this patent

UNITED STATES PATENTS

| | | |
|---|---|---|
| 2,687,918 | Bell et al. | Aug. 31, 1954 |
| 2,737,420 | Wilborn | Mar. 6, 1956 |
| 2,757,975 | Lyon | Aug. 7, 1956 |
| 2,801,883 | Householder | Aug. 6, 1957 |

FOREIGN PATENTS

| | | |
|---|---|---|
| 280,791 | Italy | June 4, 1940 |
| 832,048 | Great Britain | Apr. 6, 1960 |